Aug. 4, 1953                W. W. CRILEY                2,647,421
                        UPSETTING FORGING MACHINE
Filed Nov. 8, 1947                                    6 Sheets-Sheet 1

INVENTOR.
WILLIAM W. CRILEY
BY
Oberlin & Limbach
ATTORNEYS.

Aug. 4, 1953   W. W. CRILEY   2,647,421
UPSETTING FORGING MACHINE
Filed Nov. 8, 1947   6 Sheets-Sheet 3

Fig. 3

INVENTOR.
WILLIAM W. CRILEY
BY
Oberlin & Limbach
ATTORNEYS.

Aug. 4, 1953 W. W. CRILEY 2,647,421
UPSETTING FORGING MACHINE
Filed Nov. 8, 1947 6 Sheets-Sheet 4

INVENTOR.
WILLIAM W. CRILEY
BY
Oberlin o Limbach
ATTORNEYS.

Aug. 4, 1953 W. W. CRILEY 2,647,421
UPSETTING FORGING MACHINE
Filed Nov. 8, 1947 6 Sheets-Sheet 6

INVENTOR.
WILLIAM W. CRILEY
BY
Oberlin + Limbach
ATTORNEYS

Patented Aug. 4, 1953

2,647,421

UNITED STATES PATENT OFFICE 2,647,421

UPSETTING FORGING MACHINE

William W. Criley, Shaker Heights, Ohio, assignor to The Ajax Manufacturing Company, Euclid, Ohio, a corporation of Ohio Application November 8, 1947, Serial No. 784,785

3 Claims. (Cl. 78—17)

This invention relates to upsetting forging machines and particularly to a control system therefor.

For the purposes of illustration, the control system is shown as applied to a horizontal forging machine having the usual crank driven header slide, by which the forging tool is carried, and a grip slide by which one of the gripping dies is carried and which is driven by suitable means such, for example, as a hydraulic cylinder, in a direction transversely of the direction of travel of the header slide.

In general, such machines perform a cycle of operation in which the stock to be upset is gripped and held firmly between a stationary grip die and a cooperating die carried by the grip slide prior to the movement of the header slide theretoward, the grip slide maintaining its grip on the material until the tool carried by the header slide not only has entered and forged the stock but also has been sufficiently withdrawn from the forged stock to become released therefrom. The amount of forward movement of the header slide toward the grip slide after the grip slide is closed is generally referred to as the "stock gather" or "gather" and the amount of return movement of the header slide away from the grip slide before the grip slide releases is generally referred to as the "hold on" or simply "hold."

In the upsetting of tubular stock in such presses, it is the general practice to have a mandrel or nose on the heading tool which is arranged to extend inside of the tubular stock a considerable distance ahead of the shoulder of the tool which performs the upsetting operation. It is important therefore, to have the tube properly centered for the entrance of the mandrel and in cases where the upset is on the outside diameter, the mandrel must fit the tubular stock rather closely. Consequently, it is helpful to grip the tubular stock by the grip slide even prior to the entrance of the mandrel so as to prevent the stock from being pushed or kicked back through the grip dies during the mandrel entrance. Likewise, it is important that the hold be only long enough so that the mandrel is withdrawn from the inside of the tubular stock prior to any release of the stock by the grip dies so as to assure that the stock is not to be pulled out of the grip dies and does not travel with the mandrel on the return stroke of the header slide. On the other hand, if the gather and hold are unnecessarily long, an excessive amount of heat is transferred to the dies with resultant accelerated deterioration of the dies and a loss of temperature in the tubular stock such that it is impossible to perform subsequent upsetting operations on the stock without reheating. It is important, therefore, that the grip slide cycle be in predetermined timed relation to the header slide cycle so that the grip slide can close and grip the stock just prior to entry of the mandrel and hold it during the gather and hold period but release it promptly after the header slide with its tool and mandrel have been removed from, or sufficiently released from, the stock and then to release the stock promptly for removal. Considering that such equipment is generally very heavy and the dynamic inertia forces are considerable, timing of the cycles of the header slide and grip slide in relation to each other is difficult. Many factors are involved which make it desirable that considerable adjustment in the timing mechanism be provided to meet various conditions that may arise, for example stock thickness, temperature, amount of upset and the like. The difficulty is further complicated by the fact that it is desirable, or in fact necessary, to provide for the independent "inching" of the header slide and grip slide for "setting up" of the machine.

One of the principal objects of the present invention is to provide a timing or control mechanism which employs a plurality of independently adjustable control devices which may be so inter-related that upon manual starting of the machine both slides are caused to pass through their complete cycles in their proper relation to each other.

Another object is to provide a control for an upsetting press capable of accomplishing the foregoing object and which may readily be conditioned for independent inching of the header slide and grip slide.

A more specific object is to provide a control system so arranged that the operation of the grip slide on part of its cycle initiates the operation of the header slide which, in turn, then takes over control of its own cycle and that of the grip slide and continues the control of both until the slides have returned to their normal starting positions and which stops the slides in their starting positions and resets itself so that the cycles can be reinitiated manually.

Another specific object is to provide a control mechanism comprising a plurality of mechanical control devices which are rendered operative and inoperative by fluid pressure so as to perform their operations in the proper sequence and which are connected in a hydraulic system in a manner such that they will automatically perform in proper sequence but can be disconnected from the system and placed under a separate inching control by means of the concurrent shifting of a plurality of simple control valves which are rendered operative as a group for selective full cycle or inching operations by the movement of a single manually operated lever.

Another object is to render the control adjustable for maintaining the proper relations of the header slide and grip slide cycles for a wide range of applications.

Other objects and advantages will become apparent from the following description wherein reference is made to the drawings in which.

For the purposes of illustration, the forging press is shown as one having a heavy base or frame 1 in which is mounted a drive shaft 2, one end of which carries a fly-wheel 3 driven through belts 4 by a suitable motor.

The flywheel 3 is drivingly connected to the shaft 2 by means of a suitable fluid operated clutch (not shown) which is normally disengaged but is caused to engage by the admission of fluid pressure to a suitable operating cylinder therefore, as will later be described. At the opposite end of the shaft 2 from the flywheel 3 is a spring applied brake 5 which may be released by the application of fluid pressure to a suitable brake operating cylinder, later to be described. The shaft 2, in turn, is drivingly connected through gears 6 and 7 to a crank 8 which is connected by a suitable connecting rod 9 to the header slide 10 for reciprocating the header slide toward and away from the grip slide 12. The header slide is mounted in suitable slide ways 11 in the frame of the machine and carries a forging tool T having a mandrel portion M.

Mounted in the frame of the machine is a grip slide 12 which is movable transversely of the direction of movement of the header slide 10 in suitable slide ways 13 carried by the frame 1 of the machine. The grip slide 12 carries a suitable grip die part D and a complementary grip die part D is adjustably mounted in the usual manner in fixed position in the frame of the machine. The die parts D are so arranged that when the grip slide is closed, the die D firmly grips the outer surface of the stock to be formed and holds the stock in proper position for entry of the mandrel M in proper alignment for forging by the tool T.

In order to operate the grip slide, suitable links 14 and 15, pivotally connected to each other by a pivot 16, are pivotally connected at their other ends to the slide 12 and the frame of the machine. For expanding and contracting the links, a connecting link 17 is pivotally connected at one end to the pivot 16 and pivotally connected at the opposite end to a reciprocable cross-head 18. The cross-head 18, in turn, is connected to the piston 19 of a two-way fluid pressure operated cylinder 20 which is operative to reciprocate the cross-head 18 preferably parallel to the path of movement of the header slide 10.

The cylinder 20 is connected at its rod end to a control valve 22 by means of a pipe 21 and at its head end is connected to the valve 22 by means of a pipe 23. The valve 22 is operable, as will later be described, to admit pressure fluid to the rod end of the cylinder while exhausting it from the head end to reverse the connection for admitting working fluid to the head end of the cylinder while exhausting it from the rod end selectively so that the grip slide can be opened and closed by hydraulic or fluid pressure.

Figure 3:
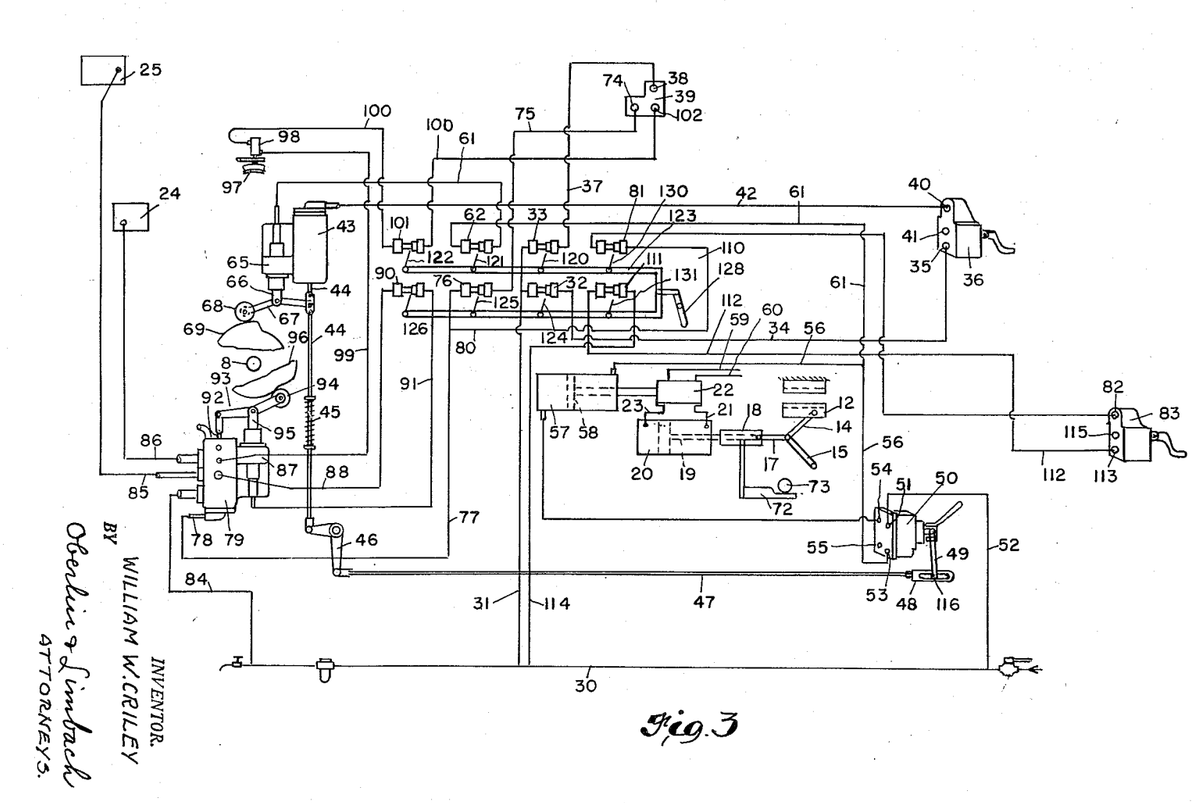
Fig. 3 is an enlarged schematic drawing of the control system of the present invention.
Figure 4:
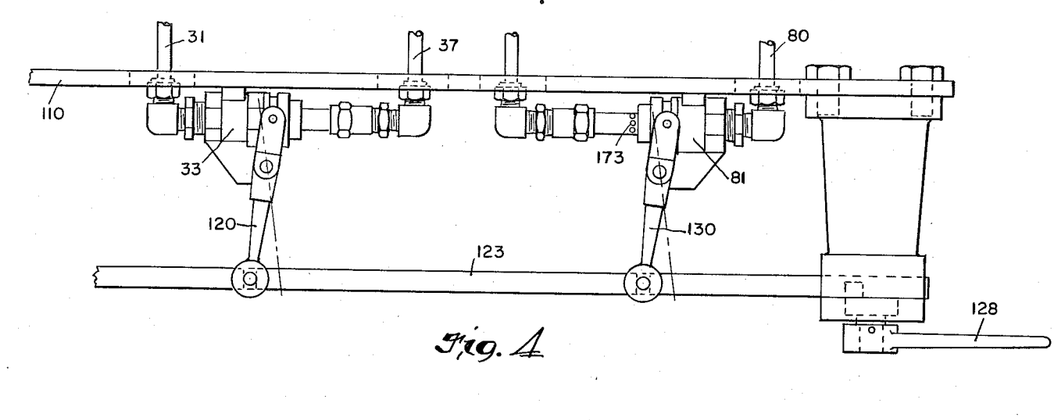
Figs. 4 and 5 are respectively, a fragmentary top plan view and a fragmentary front elevation of the control valve panel of the present control system.

Referring next to Fig. 3, the clutch is normally disengaged and is caused to engage by admission of air to its operating cylinder 24. The brake is normally spring engaged but is disengaged by admission of fluid pressure to the operating cylinder 25.

Figure 1:
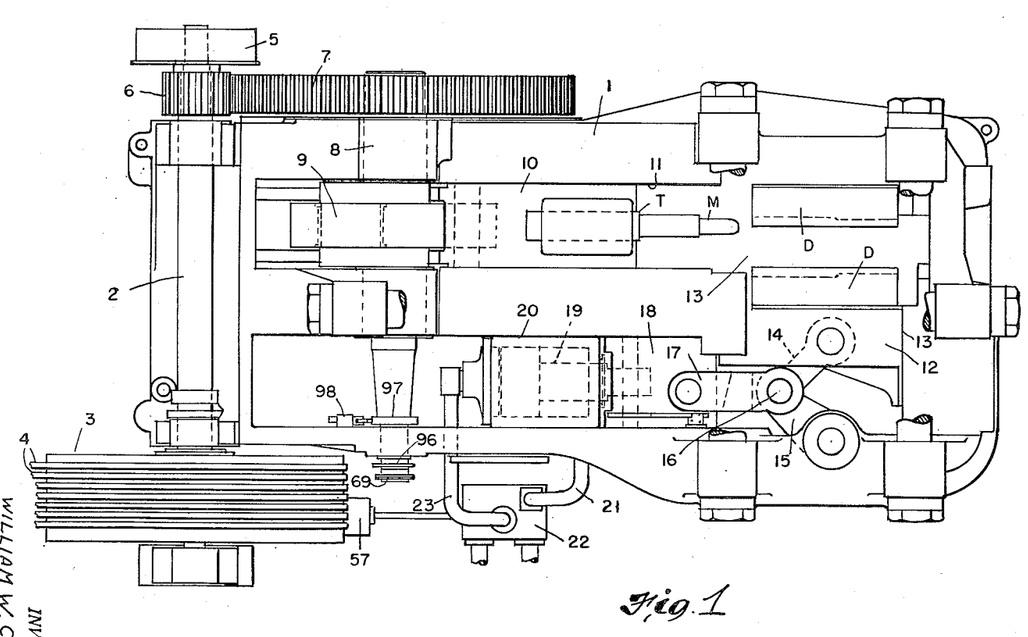
Fig. 1 is a top plan view of a horizontal forging machine with the present invention installed therein.
Figure 2:
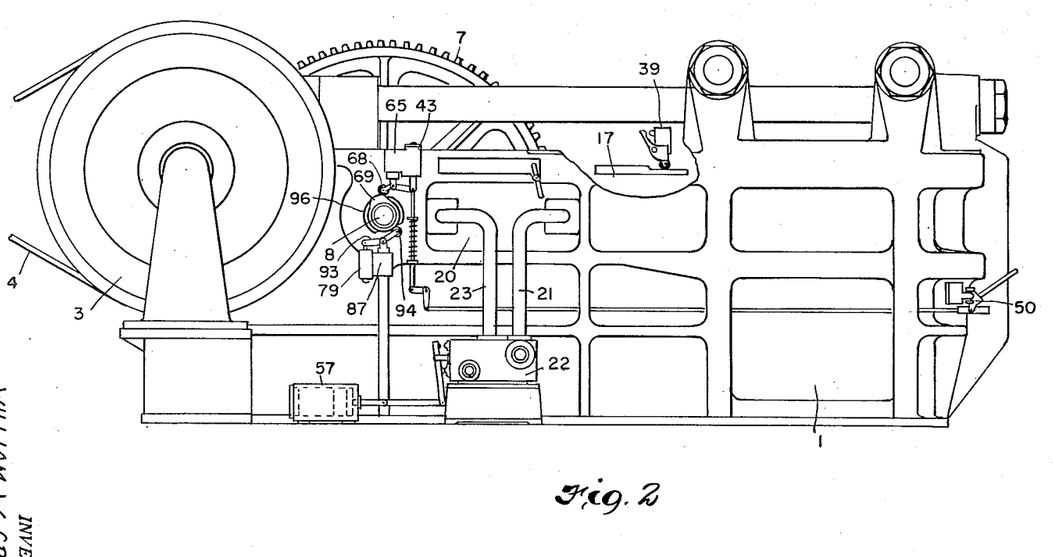
Fig. 2 is a front elevation of the machine illustrated in Fig. 1.

In order best to describe the control system it will be described generally by reference to Fig. 3, reference being made later to the specific valves and control devices referred to generally in Fig. 3. The normal cyclic operation, assuming the header slide 10 is in fully retracted position to the left in Fig. 1 and the grip slide 12 is in fully retracted or open position as illustrated in Fig. 1, is as follows:

First, the grip slide closes and firmly grips the stock, this operation occurring before the header slide 10 has begun travelling to the right in Fig. 1, or, if desired, before the header slide 10 has progressed sufficiently far to cause the mandrel M to enter the stock. After the grip slide 12 has closed, the header slide 10 starts on or continues on its forward travel gathering the stock and forging it, the grip slide remaining closed. During the return stroke of the header slide the grip slide remains closed and holds the stock until such point in the stroke as the mandrel has been freed or completely withdrawn from the stock so that the stock cannot stick on and travel with the tool mandrel. Thereupon the grip slide releases and travels to open position, and then stops. The header slide continues on its return stroke and is stopped in its open position by automatic disengagement of the clutch and application of the brake. The cycle of operation can then be reinitiated manually.

In order to effect these operations in the desired relation to each other, the control system illustrated in Fig. 3 is provided. As therein illustrated, air under pressure is supplied from a suitable source of pneumatic pressure by a pressure line 30. A pipe 31 connects the line 30 with valves 32 and 33, both of which are normally open straight through valves, and both of which may be thrown to off-position, block the flow of air therethrough and concurrently exhaust the lines connected to their outlets to the atmosphere.

The outlet of exhaust 32 is connected by a pipe 34 to the inlet port 35 of a starting valve 36. The valve 33 is connected by a pipe 37 to the inlet port 38 of a one-operation valve 39. Thus, when the valves 32 and 33 are set for normal operation, air is continuously supplied to the inlet ports of the starting valve 36 and the one-operation valve 39. The valve 36 has an outlet port 40 to admit air to the portions of the system and an exhaust port 41 which, upon release of the valve 36 permits exhaust of air from that portion of the system to which air was supplied by it. Leading from the outlet port 40 of the valve 36 is a pipe 42 which is connected to the head or inlet end of a cylinder 43. The cylinder 43 is so arranged that upon admission of air to it by the valve 36, the piston thereof is moved downwardly in Figs. 3 and 6, moving a rod 44 downwardly against the force of a restoring spring 45, and operates a bell crank 46 so as to move to the rght the control rod 47. The rod 47 carries at the end opposite from the crank 46 a suitable yoke 48 to which is pivotally connected the operating lever 49 of a reversing valve 50. The valve 50 has an inlet port 51 connected by a pipe 52 to the supply line 30 so that operating pressure is continuously supplied to the inlet of the valve 50. When air is admitted to the cylinder 43 by depression of the treadle of the valve 36, the resultant movement of the rod 47 throws the reversing valve lever 49 to the right in Fig. 3 permitting air to flow from the reversing valve through an outlet port 53 thereof while closing an outlet port 54 thereof. When the lever 49 is swung to the extreme left in Fig. 3, the outlet port 53 is closed and the outlet port 54 is opened. The valve 50 has an exhaust port 55 which, when the valve lever 49 is swung to the left in Fig. 3 to an intermediate position, exhausts to the atmosphere the air in the pipe lines beyond the ports 53 and 54. Upon opening the valve 50 by the cylinder 43 as described, air from the outlet port 53 passes through the pipe 56 to the rod end of the grip slide control cylinder 57 so as to move the piston 58 thereof to the left in Fig. 3, thus setting the control valve 22 to admit working air, or suitable hydraulic fluid, to the head end of the grip slide operating cylinder 20. This results in moving the piston 19 and the cross-head 18 to the right so as to move the grip slide 12 to closed position. Hydraulic fluid under pressure is continuously available to the valve 22 from a suitable source through the pipe 59, and the pipe 60 leads from the valve 22 to a suitable sump at the hydraulic pressure source. Thus, air supplied through the port 53 sets the valve 22 for moving the grip slide in the closing direction. At this time outlet 54 is closed. At the same time, air from the port 53 and pipe line 56 passes through pipe 61 and a normally open straight through valve 62 to the grip slide control valve 65. As will later be described, the valve 65 has a piston 66 on the end of which is a fulcrum point, on which is pivotally mounted a rocker arm 67. One end of the rocker is connected to the rod 44 and the other end carries a cam roller or follower 68 which rides on a suitable cam 69 which is circumferentially adjustably mounted on the crank shaft 8 of the header slide 10. The valve 65 is so arranged that when air is admitted to it through the pipe line 61, it operates to move the pivotal fulcrum of the rocker 67 to a lowered position in Fig. 3 and to hold it in said position so long as air is being admitted to the valve 65, thus forcing and holding the cam roller 68 firmly against the cam 69 and placing the rod 44 under the control of the cam 69. Since the air for initially maintaining the fulcrum in lowered position is supplied from the valve 50, and since the initial operation of the valve 65 holds the valve 50, in turn, in its original operating position under the control of the cam 69, the subsequent operation of the valve 50 is controlled only by the cam 69, which at this time is stationary. If, at this point, the foot treadle is released it has no effect upon stopping of the operation, as air both to the grip slide control valve 22 and the control valve 65 continues to be admitted through the valve 50 under the control of the now stationary cam 69.

Continued movement of the grip slide toward closed position by the piston 19 under the control of the cam 69 results in movement of the crosshead 18 to the right in Fig. 3.

Mounted on the cross-head 18 is an adjustable cam 72 which operates a cam roller 73 of the one-operation valve 39. When the roller 73 is on the lower portion of the cam 72, which condition obtains until the grip slide is closed, the one-operation valve 39 remains set in its starting position in which the admission of air through the inlet port 38 is blocked and an outlet port 74 thereof is connected to the exhaust to the atmosphere. When the grip slide moves to or substantially to fully closed position, the roller 73 is lifted by the cam 72 thus setting the valve 39 so that air from the inlet port 38 passes through the outlet port 74. The outlet port 74 is connected by a pipe line 75 to a normally open straight through valve 76. The outlet of the valve 76 is connected by a pipe 77 to the inlet port 78 of a clutch and brake control valve 79 and by a pipe 80 to a normally closed through valve 81, the outlet of which is connected to an inlet 82 of an inching valve 83. When air is admitted through the inlet port 78, the clutch and brake control valve 79 operate to admit pressure fluid directly from the line 30, by way of the line 84 and the valve 79, to the line 85 which leads to the brake cylinder 25 and to a line 86 which leads to the clutch cylinder 24. At the same time, it admits working air directly from the line 30 to a movable fulcrum cylinder 87 through a line 88, normally open through valve 90, and line 91. It must be noted that the air thus admitted to the cylinder 87 is not the control air from the valve 39 but the working air entering the valve 79 through the line 84. This admission of air to the cylinder 87 continues until the valve 79 is reset by its cam. As illustrated, the valve 79 has a piston rod 92 connected to one end of a rock lever 93, the other end of which carries a cam roller 94. The rock lever 93 is pivotally mounted for rocking movement on the outer end of a piston rod 95 of a piston in the cylinder 87 and it is so arranged that when air is admitted through the line 91, the pivotal fulcrum is raised, thus placing the roller 94 in cooperation with and under the control of the cam 96. The cam 96 is adjustable circumferentially and otherwise on the crank shaft 8 of the header slide. Thus the admission of air to the valve 79 admits operating pressure to the cylinders 24 and 25 which then operate to release the brake and apply the clutch so as to start the header slide on the forward or gather movement and maintain this operation under the control of the cam 96, through the medium of the cam roller 94 and rocker arm 93 so long as control pressure fluid is supplied to the line 91 and maintains the piston rod 95 in raised position.

It will be noted at this point that the grip slide first moved to or toward closed position and initiated the operation of the header slide and the header slide, as it started to move on the gather stroke, took over the control of its own cycle and the reopening of the grip slide. During this part of the cycle, air has continued to flow through the one operation valve 39.

At an adjusted point in the crank shaft revolution, and consequently the cycle of operation of the header slide, the cam 69 releases the roller 68 whereupon the spring 45 lifts the rod 44 moving the rod 47 and the operating handle 49 to the reversing valve 50 to the extreme left. As the valve 50 passes through the intermediate position from right to left in Fig. 3, the port 53 is connected to the exhaust 55 thus releasing the pressure fluid at the rod end of the cylinder 57 and also connecting the fulcrum adjustment cylinder 65 of the reversing valve control to exhaust. The connection of the cylinder 65 to exhaust releases the piston rod 66 and renders the cam roller inoperative by the cam 69. This same reversal of the valve 50 admits air to the port 54 which supplies air to the head end of the cylinder 57 causing it to operate the valve 22 to reverse the connection of the cylinder 20 to the lines 59 and 60 so that the piston 19 moves to the left and moves the grip slide to open position. This movement causes the cam 72 to release the roller 73 which sets the valve 39 to exhaust. Mounted on the crank shaft 8 is a cam 97 which operates a valve 98. The valve 98 is connected by a line 99 to the valve 79 so that normally upon operation of the valve 79 to admit air to the clutch and brake cylinders 24 and 25 for starting the header slide, air is admitted to the valve 98 through the line 99. The valve 98 is connected by a line 100 to a normally open through valve 101. The outlet end of the valve 98 is connected by valve 101 to the safety inlet port 102 of the valve 39. The valve 39 is arranged, as will later be described, so that the admission of air through the inlet 102 port disconnects the inlet 38 from the outlet 74, blocks the inlet, and connects the outlet 74 to exhaust so that the valve 39 cannot cause any repetition of operations until it is reset. Thus control air cannot be resupplied to inlet 78 of the valve 79 by way of the valve 39 and consequently the cylinder 87 is dependent for continued holding up of the fulcrum of the lever 93 on operating air from the valve 79 under the control of the cam 96. Thus the header slide is still under the control of the cam 96 and the grip slide is under the control of the cam 69 but the valve 39 has been set so that the cycle cannot be repeated after it is completed.

As the header slide returns toward open position, the cam 96 allows the roller 94 to drop into the lower part of the cam thus setting the valve 79 to off-position, cutting off the air to the clutch and brake cylinders 24 and 25 and to the cylinder 87. Thus the clutch is released and the brake applied to stop the header slide and the cycle cannot be repeated because air cannot be readmitted to the cylinder 87 except by operation of the valve 79 by air supplied from the valve 39 which has been rendered inoperative prior to the drop out of the cam 94.

When the grip slide reaches its open position to the extreme left in Fig. 3 the cam 72 permits the roller 73 to drop to the low portion of the cam 72. This operation resets the valve 39 so that air is admitted thereinto through its inlet 38 but is disconnected from the outlet 74. The operative reconnection of the outlet 74 cannot occur until the grip slide has moved again to closed position and lifts the cam roller 73.

As a result of this control system, the operation is started by the depression of the treadle of the valve 36 whereupon the grip slide closes, initiates operation of the header slide which continues throughout its cycle under its own control and takes over the control of the remainder of the grip slide cycle, thus stopping itself and causing the grip slide to continue to its fully open position whereupon the grip slide takes over the function of resetting the control so that the cycle can repeat only when initiated by depressing again the treadle of the valve 36.

As mentioned in the objects, it is desirable that independent inching of the header slide and grip slide be provided for and for this purpose the straight through valves 32, 33, 76, 62, 90 and 101 are mounted on a common panel 110 as also is the through valve 81. As mentioned heretofore, all of the heretofore described valves of the panel 110, except the valve 81 are normally in "on" position, the valve 81 being normally in "off" position. Likewise, mounted on the panel is a normally "off" valve 111 which is connected by a line 112 to the inlet 113 of the inching valve 83. At its inlet side, the valve 111 is connected by a valve 114 to the air supply line 30. For inching, it is necessary to throw the valves 32, 33, 62, 76, 90 and 101 to "off" position and to throw the valves 81 and 111 to "on" position. Since the normally "on" valves are the same and are operative to connect the control system beyond their respective outlets to exhaust when in "off" position, the control system above described is rendered inoperative by moving the normally "on" valves to off position. The normally "off" valves, on the other hand, render the inching valve 83 inoperative by connecting it to exhaust when in the normal "off" position. However, upon movement of the normally "off" valves 81 and 111 to "on" position, the inching valve 83 has its inlet connected directly to the source of fluid pressure and its outlet 82 connected to the inlet port 78 of the brake and clutch control valve 79. Thus, by operation of the inching valve, the brake and clutch can be operated independently of the operation of the header slide. The inching valve 83 has an exhaust 115 so arranged that when the treadle thereof is released, the line 112 connected to the outlet port 82 thereof is connected to exhaust and the line 112 is blocked at the inlet 113 but when the treadle is depressed, the exhaust is cut off and air is admitted to the outlet 82 and thereby to the valve 79. Thus, the valve 83 may be used to inch the header slide independently of the grip slide. As mentioned, the inlet of the reversing valve 50 is connected through to the source of pressure to the line 52, the outlet 53 thereof is connected to the rod end of the cylinder 57 which controls the operation of the header slide, and the port 54 thereof is connected to the head end of the cylinder 57. When the normally "on" valves of the panel 110 are in "off" position and the normally "off" valves are in "on" position, the reversing valve 50 is disconnected operatively from all parts of the system except the opposite ends of the cylinder 57. The lever 49 is connected to the yoke 48 by means of a suitable removable pin 116. Accordingly, in order to inch the grip slide in either direction, it is necessary only to remove the pin 116 and operate the handle 49 manually.

Figure 5:
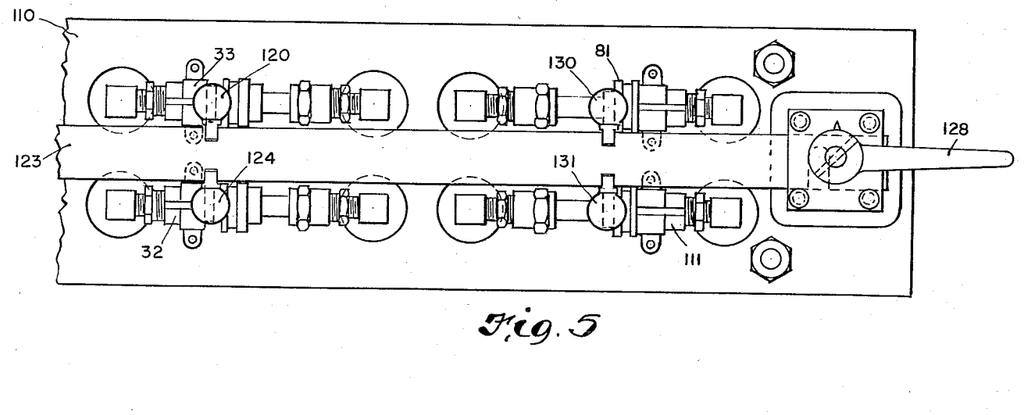

It is desirable that all of the normally "on" valves be shifted to "off" position simultaneously with the shifting of the normally "off" valves to "on" position. For this purpose, the normally "on" valves 33, 62, 101 have their operating handles 120, 121, 122 connected to a common frame member 123 and normally "on" valves 32, 76 and 90 have their operating handles 124, 125 and 126 respectively connected to the common frame member 123. The frame member 123, which is shown as two parallel bars in Fig. 3 for clearness in illustration, is in fact a single bar as illustrated in Fig. 5, and is mounted for sliding movement longitudinally of the row of valves by means of a manually operable lever 128. The valves are so arranged along the frame member 123 that movement of the lever 128 counterclockwise sets all of the normally "on" valves to "on" position, this being the position in which the cycle of the slides is automatically controlled. Movement of the lever 128 in the clockwise direction closes all of the normally "on" valves, disconnecting the automatic control. The valves 81 and 111 are correspondingly arranged with respect to the frame member 123 except that they are faced in the opposite direction. Their levers 130 and 131 are so connected to the frame member 123 that the valves 81 and 111 are closed by movement of the frame members when the latter moves to open the normally "on" valves and are opened when the frame members are moved to close the normally "on" valves. Thus, by movement of a single lever, the entire group of valves may be set simultaneously in position for automatic operation or for inching operations selectively.

Referring next to Figs. 6 through 9, the brake and clutch control, the control for reversing the valve 50, the one-operation valve 39 and the detailed construction of the normally "on" and normally "off" panel valves will be described. It should be noted that all of the normally "on" and normally "off" valves on the panel 110 are identical in construction, the only difference being that the valves 81 and 111 are reversed endwise relative to the remainder of the valves.

Figure 6:
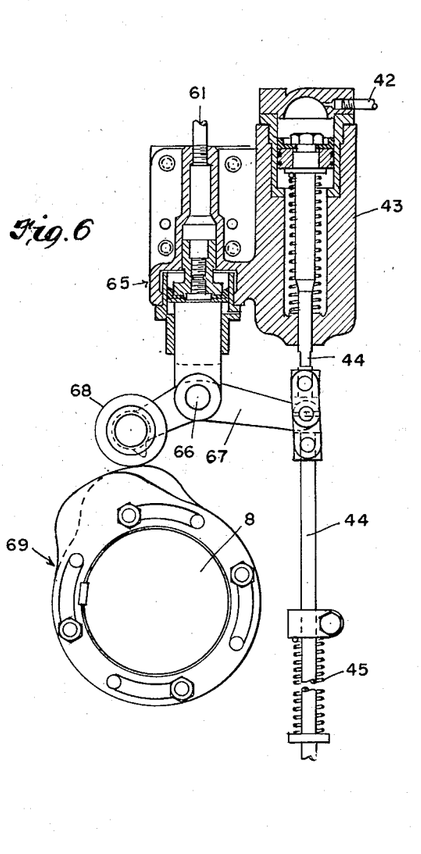
Fig. 6 is an enlarged front elevation, partly in section, of one of the control mechanisms of the present system used for starting the slides and for controlling part of the cycle thereof.

Referring next to Fig. 6, the control mechanism for the reversing valve 50 by which it is operated in response to the rotation of the crank shaft 8 after the cylinder 43 has been operated in response to the valve 36 as illustrated. As heretofore explained, upon depression of the treadle of the valve 36, control fluid pressure is admitted through the line 42 to the cylinder 43. This depresses the piston of the cylinder 43 so as to lower the rod 44 which sets the reversing valve 50 so that air is admitted therefrom through the lines 56 and 61 to the upper end of the cylinder 65. Before this operation, the line 61 is connected to exhaust so that the piston of the cylinder 65 is freely movable upwardly in Fig. 6. The admission of air through the line 61, however, forces downwardly the piston of the cylinder 65 and holds the piston rod 66 in lowered position, thus lowering the movable fulcrum or pivot and forcing the roller 68 firmly against the cam 69. The supply of fluid pressure to the cylinder 61 continues so long as the rod 44 is held in depressed condition and it will be so held in response to the cam 69 even though the supply of air is discontinued from the cylinder 43. When the roller 68 reaches the low part of the cam 69, the spring 45 can then lift the rod 44 reversing the valve 50 thus cutting off the supply of air to the cylinder 65 and connecting the line 61 to exhaust, thus releasing the piston rod 66 so that the cam roller and cam 69 are no longer effective to control the operation of the reversing valve. Thus the reversing valve is placed under the control of the cam 69 and roller 68 for holding the reversing valve in the starting position and for a predetermined portion of the cycle of the header slide after which the control is discontinued and cannot be reinitiated until the operation of the treadle of the valve 36 to reinitiate air to the cylinder 43 through the line 42.

Figure 7:
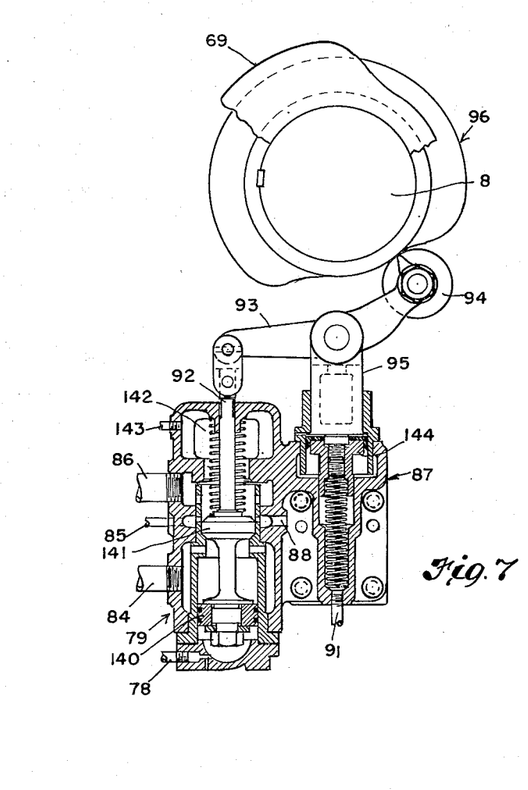
Fig. 7 is a front elevation partly in section illustrating the header slide brake and clutch operating control.

Referring next to Fig. 7, the clutch and brake control mechanism is illustrated in greater detail. As heretofore explained, the movement of the grip slide upwardly caused lifting of the cam roller 73 of the control valve 39, thus admitting air to the inlet port 78 of the control valve 79 by way of the line 77, valve 76 and line 75. The admission of air through the inlet port 78 to the valve 79 raises the valve piston 140 which carries a valve plug 141 and which is normally held in downward seated position by the spring 142. In this original seated position the operating air from the line 84, as distinguished from the control air through the inlet 78 from valve 39, is blocked by the valve plug 141. Upon lifting of the piston 140 by the air admitted through the port 78, the brake and clutch operating air supply from the line 84 is admitted to the valve 79 and therethrough to the brake cylinder line 85 and the clutch cylinder line 86, and the valve plug 141 is moved to the top of the cylinder, thus blocking off the exhaust line 143. This causes the brake to be released and the clutch to be applied for driving the shaft 8. As heretofore pointed out, the valve 79 has an outlet port connected to the line 88 and which, interiorly of the valve, is arranged to communicate with the port leading to the line 85, so that when air is passed through the valve to the brake it is also passed to the line 88, this being the air from the operating source through line 84 as distinguished from air through the control source which is admitted through line 78. The working air passes through line 88 and the line 91 to the cylinder 87 so as to lift the piston 144 thereof, thus raising the rod 95 and elevating the fulcrum or pivot point of the lever 93 so as to place the cam roller 94 into operative relation to the cam 96. Since the air holding the piston 144 in raised position is the air being admitted through the line 84, discontinuance of the air through the line 78 has no further effect on the valve plug 141 which is now held in raised position by the cam 96, roller 94, and rocker 93. Subsequently, when the roller 94 reaches the low part of the cam 96, as illustrated in Fig. 7, the air through the line 78 having theretofore been discontinued and connected to exhaust, the spring 142 lowers the valve plug 141 first cutting off the supply of air from the line 84 to the clutch operating line 86, and then to the brake operating line 85 and the line 88 which operates the piston 144, and connecting all of these lines to exhaust. Thereupon, the piston 144 is released and returns to its lowered position so that the cam 96 is no longer effective on the roller 94 for repeating the cycle.

Figure 8:
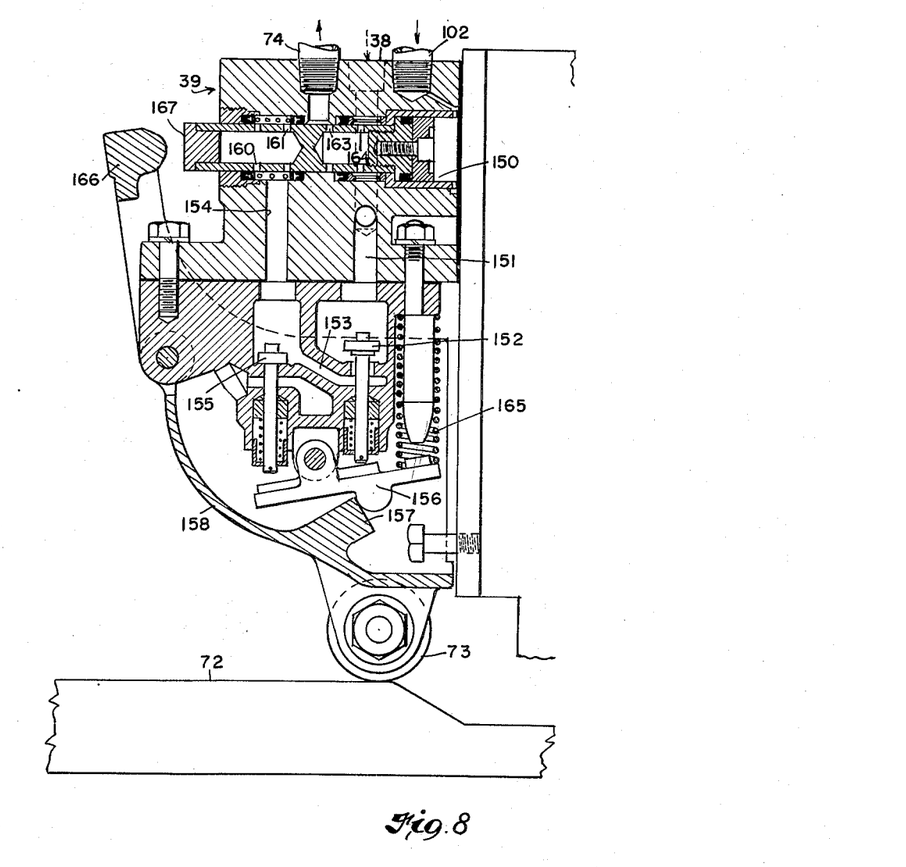
Fig. 8 is a horizontal sectional view of a one-operation valve used in the present control system.

Referring next to Fig. 8, the valve 39 is illustrated in greater detail. The position shown is one wherein the cam roller 73 has been raised by the cam 72, the grip slide then being in closed position but after the operation of the safety valve 98 by which air has been admitted to the inlet 102 of the valve 39. Assuming that the valve 98 had not as yet operated to admit air to the inlet 102, a piston valve 150 of the valve 39 would be at the extreme right in Fig. 8. When in this position, air from the source through the inlet 38 can pass through a duct 151 past a now open poppet inlet valve 152, through an internal passage 153 and outlet duct 154. It is to be noted that when the roller 73 is raised, the inlet poppet valve 152 is open and an exhaust poppet valve 155 is closed. The opening of the valve 152 is effected by a rock lever 156 when it is engaged by a suitable abutment 157 on a movable casing 158 which supports the roller 73. With the piston 150 at the extreme right, air from the duct 154 can flow through ports 160 and 161 to the outlet port 74, thus rendering the valve 39 operative to supply air through the outlet 74, lines 75, 77 and 78 to the clutch and brake control valve 79. It is apparent, therefore, that air cannot be supplied to the valve 79 except when the grip slide is in closed position with the cam 72 holding the roller 73 in raised position and the piston valve 159 is at the extreme right. The piston 150 is primarily to prevent automatic repeat of the cycle and to render the control system inoperative at the proper point in the cycle. Assuming the shaft 8 is rotating and the header slide is being driven thereby on gather, having been started by admission of air from the port 74 to the valve 79 and being maintained thereafter by air through the line 84 and with the valve under the control of the cam 94, the operation would be repeated after the valve plug 141 of valve 79 was lowered by the cam if the air continued to flow through the line 78. However, before the cam roller 94 is dropped out to disconnect the brake and clutch, the cam 97 has operated the valve 98 so as to admit air through safety inlet 102 of the valve 39, thus driving the piston 150 to the extreme left to the position shown in Fig. 8. In this position, both ports 160 and 161 are blocked both from the exhaust and from the outlet port 74 and the outlet port 74 is connected by ports 163 and 164 to a suitable exhaust formed in the valve 39. Accordingly, no air can be supplied to the port 78 of the valve 79.

When the grip slide has returned sufficiently in the direction of its starting position to engage the rolls 73 with the high point of the cam 72, the casing 158 swings in a counterclockwise direction allowing the rocker 156 to be operated by a spring 165 so as to permit the spring seated inlet valve 152 to close while opening the spring seated exhaust valve 155. This same action causes a rigid arm 166 on the casing 158 to engage a suitable abutment 167 on the piston valve 150, thus returning the piston 150 to the extreme right in Fig. 8 in which case the inlet passage 38 is connected to the outlet passage 74 through the ducts 151, 153 and 154, and ports 160 and 161, except as blocked by the valve 152.

It is apparent that immediately upon the grip slide moving the cam 72 so as to raise the roller 73, the valve 152 will be opened and the valve 155 closed and air will immediately be passed to the outlet 74.

Figure 9:
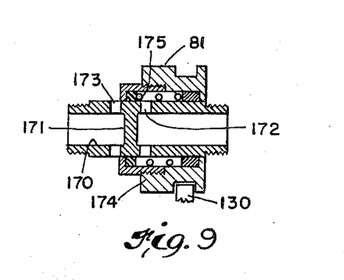
Fig. 9 is a horizontal sectional view of one of the valves of the control panel employed for connecting the system for automatic operation through a complete cycle and for connecting it for inching, selectively.

Referring next to Fig. 9 the straight through valve 81 is illustrated and is illustrative of all of the valves on the control panel 110. The valve comprises essentially a short sleeve 170 adapted for connection at its ends to the pipe line. Intermediate its ends, it is provided with an internal bridge wall 171 at opposite sides of which are ports 172 and 173, respectively. A valve collar 174 is slideable axially on the sleeve 170 and is provided with an annular chamber 175 arranged relative to the ports 172 and 173 so as to provide a connection therebetween when the valve sleeve 174 is at the extreme left in Fig. 9. The ports 172 and 173 are so spaced from each other that when the sleeve 174 is at the extreme right as illustrated in Fig. 9, the inlet port 172 is blocked while the other port 173 is connected to the outside atmosphere. As mentioned, the normally "on" valves are the same as that illustrated in Fig. 9 but are reversed end for end.

The sleeve 174 is movable to the selected positions by its operating lever 130 which, in turn, is moved by the frame membr 123 as heretofore described. Thus, it is apparent that once the machine has been started, it completes its entire cycle under automatic control and stops at the completion of the cycle and the cycle cannot be reinitiated except by the operator. On the other hand, merely by shifting the lever 123 from the "run" position illustrated in Figs. 3 and 5 to the "inching" position, the automatic control is rendered ineffective and each slide is placed under manual control independently of the other.

As mentioned, it is desirable that adjustment be provided as to each of the cycles. For this purpose, the cam 72 may be adjustably mounted for adjustment lengthwise of the slide 18. Likewise, the cam 96 is arranged in two overlapping parts, both adjustable circumferentially of the crankshaft 8. Thus not only may the cam be shifted as a whole circumferentially of the crankshaft but the two edges can be independently shifted, thus increasing and decreasing the high and low parts of the cam. Correspondingly, the cam 69 is arranged in two circumferentially adjustable parts for this same purpose.

It is to be noted that the mechanical controls of the invention are shown, for purposes of illustration, as operated for the most part by the crankshaft as this is the most convenient part of the header slide driving means on which to provide them, though it is apparent that the development of the cams may be applied directly to the header slide or other parts of the driving means for performing the same functions and such is within the scope of the invention. Likewise, in the case of the grip slide while the cam has been shown as connected directly to the crosshead 18 it is, in operative effect, the same as though connected to the driving means thereof or to the grip slide and such likewise is within the scope of the invention.

The important feature in each instance is that the mechanical controls be operatively connected to, or operated in timed relation to, the slide and to each other so as to cause the slides to operate in predetermined relation to each other.

Having thus described my invention, I claim:

1. In a forging machine having a grip slide, a header slide, and separate drive means for such two slides; the combination of means manually operable to initiate actuation of such drive means for such grip slide to advance the latter, control means automatically operated by said manually operated means to maintain the actuation of said drive means after said manually operable means returns to inoperative position and thereby to continue advance of such grip slide toward closed position, control means responsive to predetermined advance of such grip slide automatically operative to initiate actuation of such drive means for such header slide to advance the latter, thereby positively ensuring that the work will be firmly gripped prior to engagement by such header slide, control means automatically operative to continue advance and return of such header slide to fully retracted position, and control means responsive to predetermined retraction of such header slide automatically operative to actuate such drive means for such grip slide to retract the latter, thereby positively ensuring that the work will remain firmly gripped until disengaged by such header slide.

2. In a forging machine having a grip slide, a header slide, a fluid-pressure system adapted to reciprocate such grip slide, and rotary drive means operative to reciprocate such header slide; the combination of control valve means manually operable to initiate actuation of such fluid-pressure system to advance such grip slide, control means responsive to fluid pressure admitted by said valve means to maintain said valve means open to thereafter continue advance of such grip slide, control means for such header slide operated by predetermined advance of such grip slide to connect such header slide in driven engagement with such rotary drive means to reciprocate the same, cam control means driven with such header slide operative to reverse said valve means upon predetermined return movement of such header slide to return such grip slide, and a second cam control means driven with such header slide operative to disconnect such header slide from such rotary drive means upon return of such header slide to starting position.

3. In a forging machine having a grip slide, a header slide, a fluid-pressure piston-cylinder assembly operative to reciprocate such grip slide, and drive means operative to reciprocate such header slide; control valve means manually operable to initiate actuation of such fluid-pressure piston-cylinder assembly to advance such grip slide, cam means rendered operative by such actuation of said valve means effective to maintain said valve means open to continue advance of such grip slide, fluid pressure means operative to connect such header slide in driven engagement with such drive means for such header slide to advance the latter, valve means actuated by predetermined advance of such grip slide adapted to actuate said fluid pressure means, cam control means rendered operative by such actuation of said last named valve means to maintain the latter open to hold such header slide in driven engagement with such drive means therefor, said first cam means being driven with such header slide and operative to reverse said first valve means upon predetermined return movement of such header slide, thereby also to return such grip slide, and said second cam means being operative upon return of such header slide to starting position to close said second valve to disengage such header slide from such drive means therefor.

WILLIAM W. CRILEY.

References Cited in the file of this patent

UNITED STATES PATENTS

| Number | Name | Date |
|---|---|---|
| 757,409 | Olson | Apr. 12, 1904 |
| 2,032,836 | Criley | Mar. 3, 1936 |
| 2,106,830 | Criley | Feb. 1, 1938 |
| 2,141,951 | Criley | Dec. 27, 1938 |
| 2,165,614 | Cook | July 11, 1939 |
| 2,301,028 | Esch | Nov. 3, 1942 |
| 2,343,403 | Criley | Mar. 7, 1944 |

FOREIGN PATENTS

| Number | Country | Date |
|---|---|---|
| 8,753 | Great Britain | Apr. 11, 1910 |